(12) United States Patent
Yuan

(10) Patent No.: US 12,178,233 B2
(45) Date of Patent: Dec. 31, 2024

(54) FOOD MIXTURE FORMING APPARATUS

(71) Applicant: ANKO FOOD MACHINE CO., LTD., New Taipei (TW)

(72) Inventor: Chien Yuan, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 261 days.

(21) Appl. No.: 17/394,555

(22) Filed: Aug. 5, 2021

(65) Prior Publication Data
US 2022/0361553 A1 Nov. 17, 2022

(30) Foreign Application Priority Data

May 12, 2021 (TW) ................... 110205339

(51) Int. Cl.
*A23P 30/10* (2016.01)
*A22C 7/00* (2006.01)

(52) U.S. Cl.
CPC ............ *A23P 30/10* (2016.08); *A22C 7/0084* (2013.01)

(58) Field of Classification Search
CPC ..... A22C 7/0084; A22C 7/0038; A22C 7/003; A23P 30/10
See application file for complete search history.

(56) References Cited

U.S. PATENT DOCUMENTS

| | | | | |
|---|---|---|---|---|
| 2,101,755 A * | 12/1937 | Rosenstone | .......... | A22C 7/0076 100/98 R |
| 3,939,530 A * | 2/1976 | Holly | ...................... | A23P 30/10 425/562 |
| 4,043,728 A * | 8/1977 | Holly | ................... | A22C 7/0084 425/557 |
| 4,054,967 A * | 10/1977 | Sandberg | ............. | A22C 7/0084 426/512 |
| 4,334,339 A * | 6/1982 | Holly | ................... | A22C 7/0084 425/562 |
| 4,597,135 A * | 7/1986 | Holly | ................... | A22C 7/0084 426/513 |
| 4,608,731 A * | 9/1986 | Holly | ................... | A22C 7/0084 426/516 |
| 4,996,743 A * | 3/1991 | Janssen | .................. | A21C 11/00 425/236 |
| 5,181,456 A * | 1/1993 | Theys | ..................... | A23P 30/10 425/444 |
| 5,223,297 A * | 6/1993 | Theys | ..................... | A23P 30/10 426/514 |
| 5,655,436 A * | 8/1997 | Soper | .................... | A22C 7/0084 99/426 |
| 7,014,456 B1 * | 3/2006 | Tournour | ............. | A22C 7/0084 425/572 |
| 2003/0075055 A1 * | 4/2003 | Tournour | ................ | A23P 30/10 99/427 |

(Continued)

FOREIGN PATENT DOCUMENTS

FR 2903573 A1 * 1/2008 ........... A22C 7/0084

*Primary Examiner* — Seyed Masoud Malekzadeh
(74) *Attorney, Agent, or Firm* — Rivka Friedman

(57) ABSTRACT

The present utility invention provides a food mixture forming apparatus, which comprises a forming assembly and a demolding assembly. The forming assembly comprises a first slider and a second slider. First, the first slider and the second slider move along a first direction to shape a food mixture, then, the demolding assembly moves along a second direction to finish the forming process.

9 Claims, 5 Drawing Sheets

(56) References Cited

U.S. PATENT DOCUMENTS

| | | | | |
|---|---|---|---|---|
| 2004/0132396 A1* | 7/2004 | Gallant | ............... | A22C 7/0084 452/175 |
| 2005/0013895 A1* | 1/2005 | Azzar | ............... | A23P 30/10 425/572 |
| 2005/0072312 A1* | 4/2005 | Pasek | ............... | A22C 7/0038 425/192 R |
| 2005/0072634 A1* | 4/2005 | Pasek | ............... | A23P 30/10 184/5 |
| 2005/0074513 A1* | 4/2005 | Pasek | ............... | A22C 7/0023 425/424 |
| 2005/0089596 A1* | 4/2005 | Gosz | ............... | A23P 30/10 425/208 |
| 2005/0092187 A1* | 5/2005 | Lamartino | ............... | A23P 30/10 99/353 |
| 2005/0095309 A1* | 5/2005 | Hansen | ............... | A23P 30/10 425/119 |
| 2005/0103207 A1* | 5/2005 | Hansen | ............... | A23P 30/10 99/353 |
| 2005/0230875 A1* | 10/2005 | Miller | ............... | A22C 7/0084 425/149 |
| 2008/0066627 A1* | 3/2008 | Lamartino | ............... | A23P 30/10 99/447 |
| 2008/0181997 A1* | 7/2008 | Cowart | ............... | A22C 7/0084 426/389 |
| 2008/0260885 A1* | 10/2008 | LaBruno | ............... | A23P 30/10 425/261 |
| 2010/0209575 A1* | 8/2010 | Moore | ............... | A22C 7/0038 425/444 |
| 2012/0045534 A1* | 2/2012 | Lindee | ............... | A23P 30/10 425/256 |
| 2015/0320059 A1* | 11/2015 | Lindee | ............... | A22C 7/0084 425/585 |
| 2017/0325469 A1* | 11/2017 | Payne | ............... | A22C 7/0084 |
| 2020/0154754 A1* | 5/2020 | Lindee | ............... | A23P 30/10 |

* cited by examiner

10

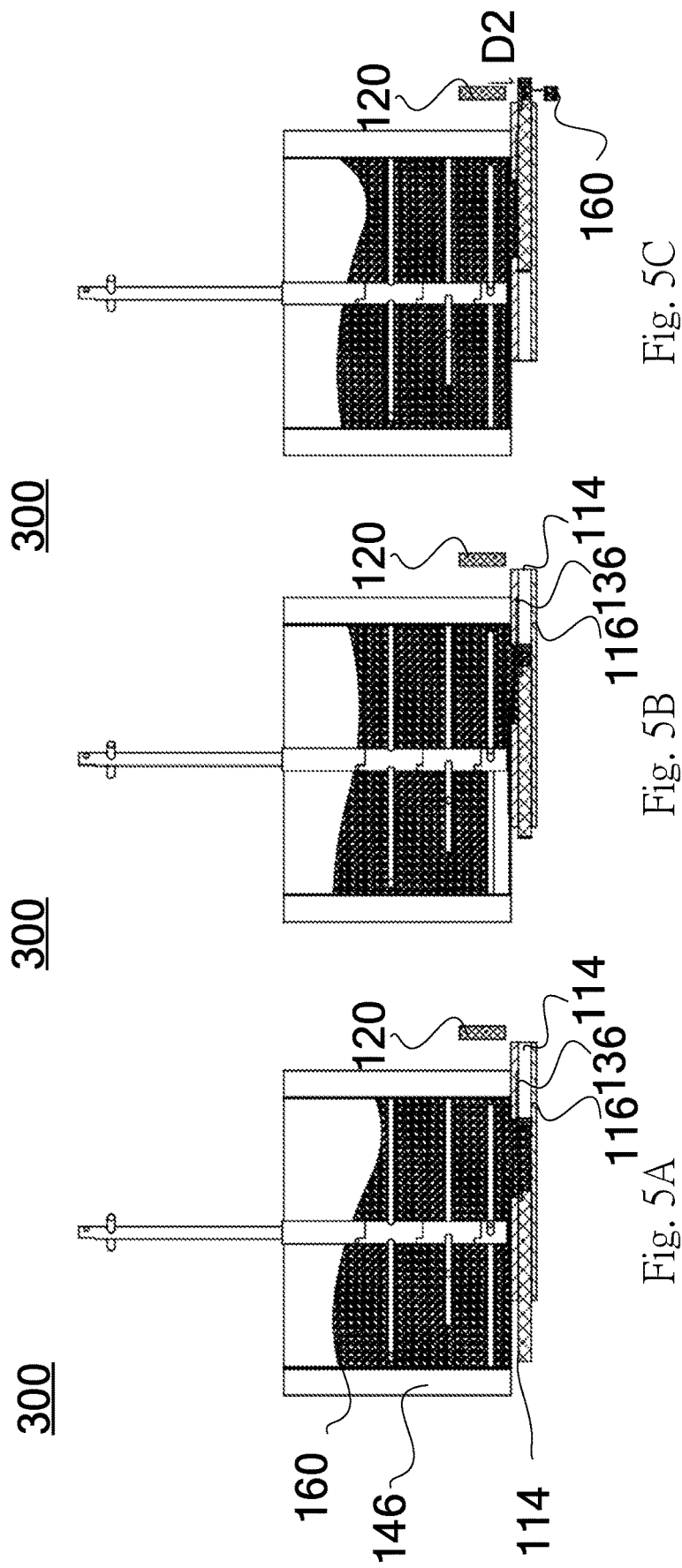

FOOD MIXTURE FORMING APPARATUS

FIELD OF THE INVENTION

The present invention relates to a food mixture forming apparatus, and in particular, is related to an apparatus applied in a field of food processing machinery, for solving the forming issue of food mixture without lubricant.

BACKGROUND OF THE INVENTION

With reference to FIGS. 1A-1C, side views of the operation of a food material mixture molding device 1 according to the conventional art. In general, in the conventional art, in order to tightly fill the food mixture 160 from a feeding barrel 146 into a molding space 12 formed by the mold 11. In the molding space 12, when the food mixture 160 enters the molding space, meanwhile, the food mixture 160 will be completely filled the molding space 12 by the screw and the blade with pushing action as shown in the figure. However, the pressure of the pushing action also makes the food mixture 160 which has already molded easily to accumulate on the mold 11. At the same time, in order to reduce the problems caused by accumulation, generally speaking, when the food mixture 160 is pressurized into the molding space 12, the food mixture 160 will have at least two-dimensional movements. For example, the food mixture 160 is pushed by a piston 13 to move from right to left, and then to the lower-left to enter the molding space 12. It can be seen from the figure that when the piston 13 moves to the leftmost side, there will be a little space between the front end of the piston 13 (or the screw-type component with the function of pressure filling as described above) and the mold 11. When the characteristics of the food mixture 160 (viscosity, density, fluid characteristics, etc.) is changed, the above-mentioned space is likely to accumulate the food mixture 160 continuously, and the connection between the feeding barrel 146 and the molding space 12 may also accumulate the food mixture 160. Finally, the piston 13 cannot be operated (malfunctioned). Basically, in the conventional art, there is absolutely no way to deal with food materials that are easy to physical sticking and accumulation without adding grease or other edible lubricants.

Hence, it is needed to provide a food mixture forming apparatus, for solving the aforementioned technical problem.

SUMMARY OF THE INVENTION

In order to solve the aforementioned technical problems of the conventional art, the object of the present invention is to provide a food mixture forming apparatus which comprises a forming mold assembly and a demolding assembly. The forming mold assembly comprises a first slider and a second slider. The first slider and the second slider are disposed on a platform. The first slider comprises a sliding region and a feeding region. The sliding region houses the second slider. A food mixture enters the feeding region to be moved on the platform by the first slider and the second slider. The first slider and the second slider both perform reciprocation motion along a first direction. The demolding assembly performs reciprocation motion along a second direction, to make the food mixture to be separated from the forming mold assembly and the platform at a first side of the platform.

In one preferred embodiment, the first slider further disposes with a first scraper. The first scraper is used for removing the food mixture which is higher than the first scraper along the second direction and adjusting a weight of the food mixture entering the feeding region, in order to make the food mixture to present a predetermined height along the second direction and a predetermined weight.

In one preferred embodiment, the second slider further disposes with a second scraper. The second scraper is used for removing the food mixture which is higher than the second scraper along the second direction and adjusting a weight of the food mixture entering the feeding region, in order to make the food mixture to present a predetermined height along the second direction and a predetermined weight.

In one preferred embodiment, a predetermined width of the food mixture is a nearest distance between the first slider and the second slider along the first direction, meanwhile, the food mixture is formed to a predetermined shape.

In one preferred embodiment, the food mixture forming apparatus further comprises a feeding barrel. The feeding barrel is used for placing the food mixture on the platform with a pressure, which is lower than another pressure performed on the food mixture by the first slider and the second slider when they are closest to each other.

In one preferred embodiment, the food mixture forming apparatus further comprises a loading region. The food mixture is separated from the forming mold assembly through a separation hole to the loading region.

In one preferred embodiment, the loading region, the platform and the first slider and the second slider are orderly disposed along the second direction.

In one preferred embodiment, while the first slider and the second slider are at a second side along the first direction with respect to the first side, the food mixture is entered into the feeding region. While the second slider moves toward the first side along the first direction until the food mixture are shaped to a predetermined shape and push an excess of the food mixture outside the feeding region. While the predetermined shape is finished, the first slider and the second slider move from the second side to the first side along the first direction to bring the food mixture moving together.

In one preferred embodiment, the food mixture is a food material without edible lubricating materials.

In one preferred embodiment, the platform further comprises a separation hole and a baffle on the first side. While the food mixture does not move to the separation hole, the baffle blocks the separation hole. While the food mixture moves to the separation hole, the baffle leaves the separation hole.

Compared with the conventional art, the present invention uses the forming mold assembly to return excess food back to the feeding barrel when forming in the feeding area, without accumulation. Multiple components reciprocating on the same plane make the food mixture and the individual component are kept consistent moving direction (for example, when the one component is moving on the first direction, the food mixture is moved on the first direction by the component, when another component is moving on the second direction, the food mixture is moved on the second direction by the other component. The food mixture merely moves on the same direction as the component at all time) to form the predetermined shape and continuous production.

DESCRIPTION OF THE DIAGRAMS

FIG. 5A-5C are side views of the operation of a second embodiment of a food mixture forming apparatus according to the present application.

DETAILED DESCRIPTION OF THE PREFERRED EMBODIMENTS

The following description of the embodiments is given by way of illustration with reference to the specific embodiments in which the invention may be practiced. The terms such as "up", "down", "front", "back", "left", "right", "inside", "outside", "side", etc., The direction of the diagram. Accordingly, the use of a directional term is used to describe and to understand the present invention and is not intended to limit the invention.

Figure 2:
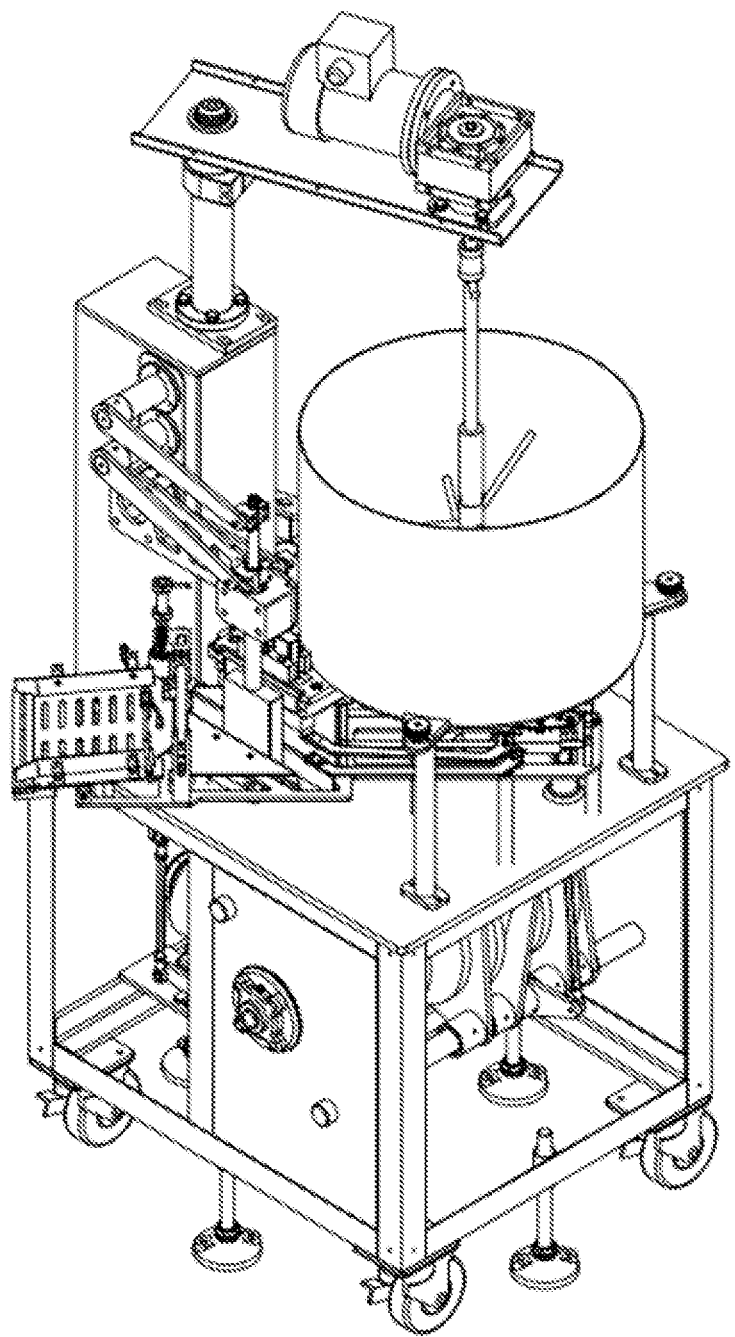
FIG. 2 is an illustrative diagram of a whole machine of a first embodiment of a food mixture forming apparatus according to the present application.
Figure 3:
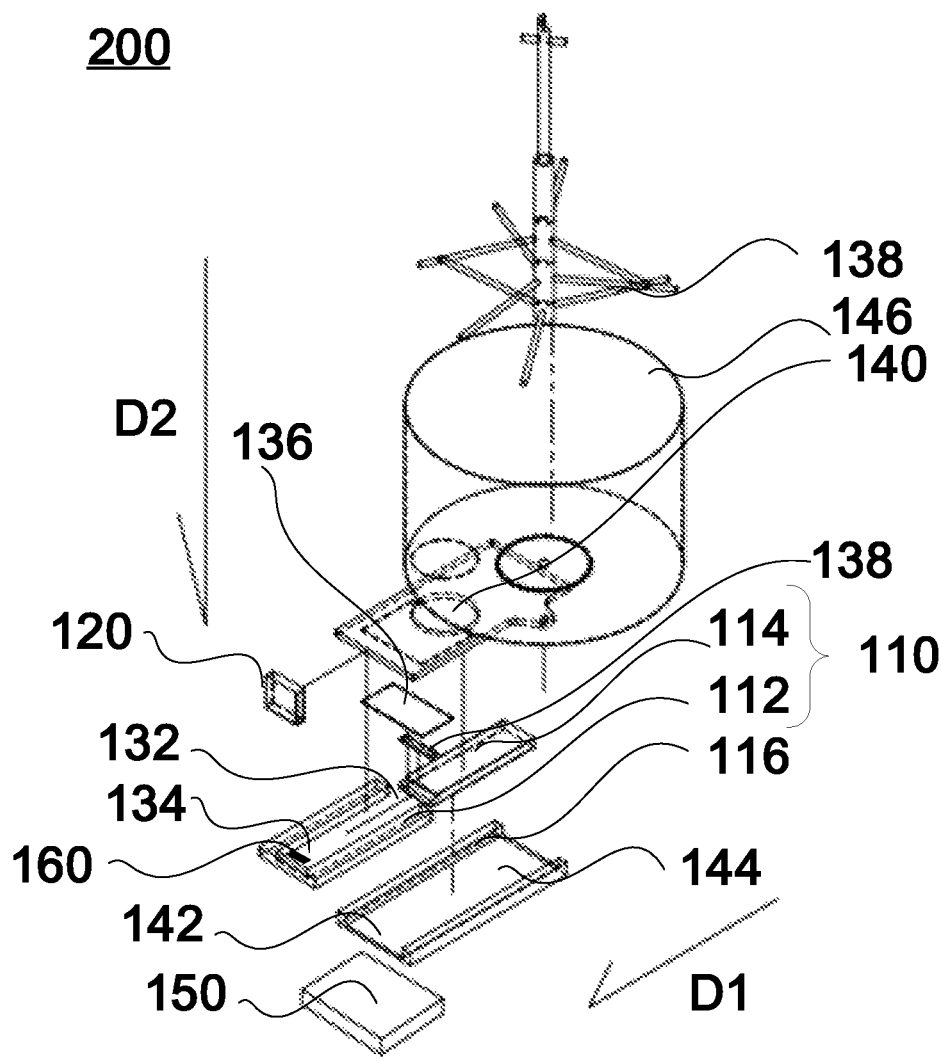
FIG. 3 is an explosive diagram of a whole of a first embodiment of a food mixture forming apparatus according to the present application.

Please referring to FIGS. 2-3, FIG. 2 is an illustrative diagram a whole 10 of a first embodiment of a food mixture forming apparatus 200 according to the present application; FIG. 3 is an explosive diagram of a whole 10 of a first embodiment of a food mixture forming apparatus 200 according to the present application. In addition to the food mixture forming apparatus 200, the whole 10 also includes a corresponding transmission mechanism and a conveying mechanism. However, the main technical feature of this invention is focused in the food mixture forming apparatus 200 and related mechanisms, but only for food mixture forming apparatus 200 and related mechanisms will be described.

The food mixture forming apparatus 200 which comprises a forming mold assembly 110, a demolding assembly 120, a feeding barrel 146 and a loading region 150. The forming mold assembly 110 comprises a first slider 112 and a second slider 114. The first slider 112 and the second slider 114 are disposed on a platform 116. The first slider 112 comprises a sliding region 132 and a feeding region 134. The sliding region 132 houses the second slider 114. A food mixture 160 enters the feeding region 134 to be moved on the platform 116 by the first slider 112 and the second slider 114. The first slider 112 and the second slider 114 both perform reciprocation motion along a first direction D1. The demolding assembly 120 performs reciprocation motion along a second direction D2, to make the food mixture 160 to be separated from the forming mold assembly 110 and the platform 116 at a first side 142 of the platform 116. Preferably, the demolding assembly 120 could be a pushing rod.

Figure 1:
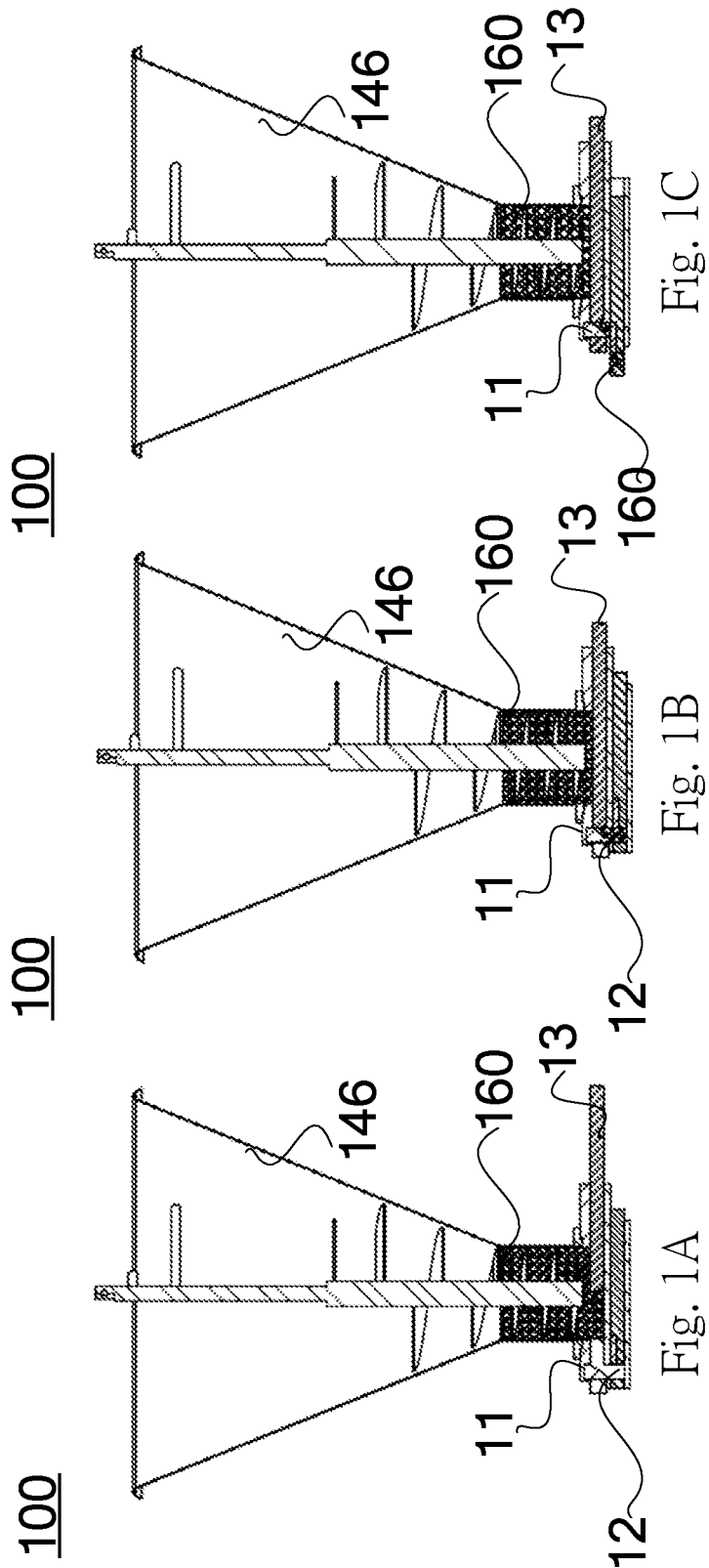
FIG. 1A-1C are side views of the operation of a food mixture forming apparatus according to the conventional art.

In detail, the first direction D1 and the second direction D2 are perpendicular to each other in any plane, the purpose is making the moving direction of the food mixture 160 at the same process are linear and the same as the moving component. The food mixture 160 will not move left and down and face the technical problem as the conventional art when the piston 13 is left-pushing as FIGS. 1A-1C.

In detail, in the invention, the first slider 112 is hollow in the second direction D2, that is, although the food mixture 160 enters the feeding area 134 of the first slider 112, In fact, the food mixture 160 is placed on the platform 116 in the second directions D2. The purpose of using independent components in this preferred embodiment is to facilitate maintenance and replacement of independent parts (the first slider 112 and the platform 116 can be replaced separately). However, the first slider 112 and the platform 116 can also be manufactured in an integrated manner.

Preferably, the food mixture 160 is placed on the platform 116 by the feeding barrel 146 through a feeding hole 140 provided below the feeding barrel 146 in a non-pressurized manner. In detail, in this preferred invention, a plurality of stirring rods 138 or propeller blades are used to push the food mixture 160 through the feeding hole 140 at a pressure, which is lower than another pressure performed on the food mixture by the first slider 112 and the second slider 114 on the platform 116. Hence, it is possible to maintain a predetermined shape without excessive extrusion, instead of using a screw or the like to feed the food mixture 160 in a closed and pressurized manner. Preferably, the food mixture 160 is cooperated with the reciprocating motion of the forming mold assembly 110 to control the weight of each entry into the feeding region 134 to a fixed weight. In other words, the shape in the second direction D2 can be shaped when the demolding assembly 120 is in contact with the food mixture 160.

Preferably, the first slider 112 further disposes with a first scraper 136. The first scraper 136 is used for removing the food mixture 160 which is higher than the first scraper 136 along the second direction D2 and adjusting a weight of the food mixture 160 entering the feeding region 134, in order to make the food mixture 160 to present a predetermined height along the second direction D2 and a predetermined weight.

Preferably, the second slider 114 further disposes with a second scraper 138. The second scraper 138 is used for removing the food mixture 160 which is higher than the second scraper 138 along the second direction D2 and adjusting a weight of the food mixture 160 entering the feeding region 134, in order to make the food mixture 160 to present a predetermined height along the second direction D2 and a predetermined weight.

As mentioned above, it is selectable of choosing the first scraper 136 and/or the second scraper 138. With the process of the reciprocation movement of the scraper and the sliders, the excess of the food mixture 160 are pushed back to the feeding hole 140. Furthermore, the feeding barrel 146 provide to the food mixture 160 with a pressure, which is lower than another pressure performed on the food mixture 160 by the first slider 112 and the second slider 114, so it will not interfere the back pushing of the food mixture 160. In principle, when the first slider 112 and the second slider 114 are closest to each other, assuming that the feeding hole 140 is sealed, the feeding region 134 can be regarded as a closed space, so in normal situation (the feeding hole 140 is not sealed), when the first slider 112 and the second slider 114 are approaching to each other, it is possible to push the excess of the food mixture 160 back to the feeding hole 140. Preferably, the scraper is set independently from the slider (similar to the configuration of the first slider 112 and the platform 116).

Preferably, a predetermined width of the food mixture 160 is a nearest distance between the first slider 112 and the second slider 114 along the first direction D1, with the cooperation of removing the excess of the food mixture 160 by the above scraper, the food mixture 160 is formed to a predetermined shape. When the first slider 112 and the second slider 114 are closest in the first direction D1, the shape of the feeding region on a plane parallel to the platform 116 is cooperated with a scraper to form the predetermined shape. The predetermined shape can be a cylindrical shape, a rectangular column shape, a pie shape, or a three-dimensional shape with at least two planes of upper and lower. It should be noted that the predetermined width is when the predetermined shape appears to be a rectangular on the plane of the platform 116; however, when the predetermined shape does not appear to be a rectangular on the plane of the platform 116, the predetermined width is not limited on this, it is only used to define the state where the first slider 112 and the second slider 114 are closest to each other in the first direction D1, in other words, it means a moment when the food mixture 160 is just formed the predetermined shape.

After the food mixture 160 is shaped into the specific shape by the relative movement of the first slider 112 and the second slider 114 (or cooperation with the first scraper 136 and/or the second scraper 138), The demolding assembly 120 separates the food mixture 160 from one side of the platform 116 from the forming mold assembly 110 and places it in the loading region 150. In detail, after the first slider 112 and the second slider 114 move relative to each other on the platform, the food mixture 160 is formed. The food mixture 160 is clamped between the first slider 112 and the second slider 114 to a certain extent, then the food mixture 160 is moved to the first side 142 to a position beyond the platform 116. At this time, the demolding assembly 120 can reciprocate in the second direction D2 and separate the food mixture 160 from the forming mold assembly 110 from the first side 142 of the platform 116.

Preferably, the loading region 150, the platform 116 and the forming mold assembly 110 (the same horizontal level as the first slider 112 and the second slider 114) are orderly disposed along the second direction D2.

In actual operation, when the first slider 112 and the second slider 114 are on the second side 144 of the platform 116 (as far as FIG. 3 is concerned, the second side 144 means those position which relative right to the first side 142), the food mixture 160 enters the feeding region 134 from the feeding hole 140 of the feeding barrel 148. When the first slider 112 and the second slider 114 move from the second side 144 drives the food mixture 160 to the first side 142, the food mixture 160 has been completely shaped by the action of the first slider 112 and the second slider 114. Preferably, the first side 142 and the second side 144 referred to herein are expressed on the area of the platform 116.

Preferably, the food mixture 160 is a food material without edible lubricating materials. In detail, the edible lubricating materials include foodstuffs having a lubricating effect such as edible fats and oils. In other words, the food mixture 160 referred to this invention may be, for example, vegetables containing only roots, stems, and leaves, or food materials without edible lubricating materials.

Figure 4:
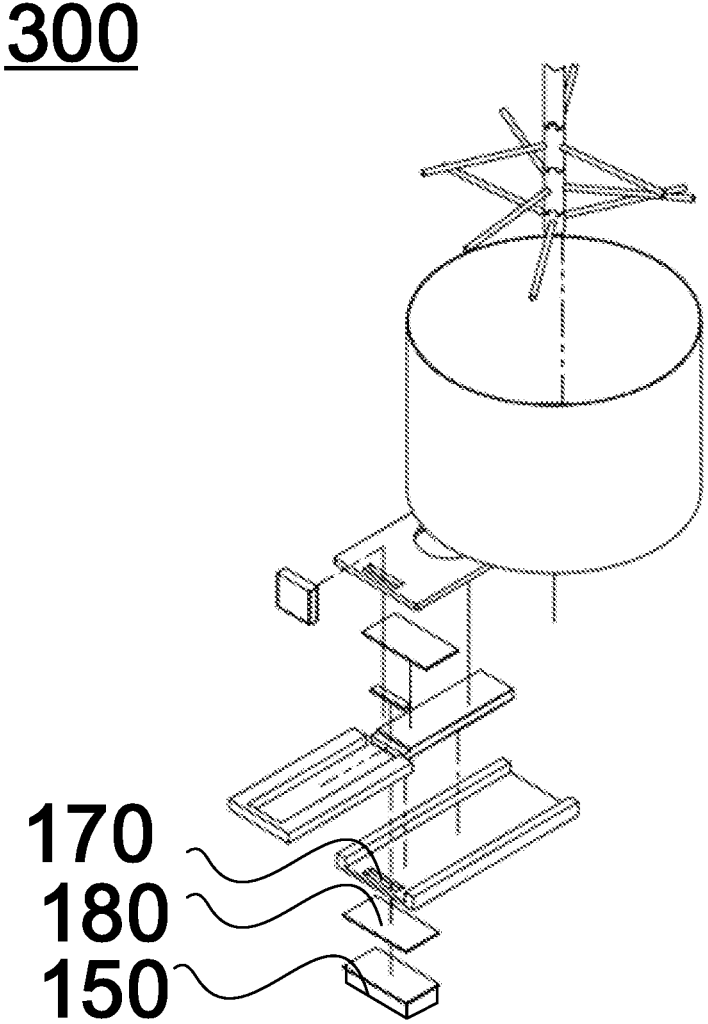
FIG. 4 is an explosive diagram of a second embodiment of a food mixture forming apparatus according to the present application.

FIG. 4 is an explosive diagram of a second embodiment of a food mixture forming apparatus 300 according to the present application. Please refer to FIG. 3 for the same component numbers, which will not be repeated here. The difference between the present embodiment and the first embodiment is: the platform 116 of the present embodiment further comprises a separation hole 170 and a baffle 180 on the first side 142. While the food mixture 160 does not move to the separation hole 170 yet, the baffle 180 blocks the separation hole 170. While the food mixture 160 moves to the separation hole 170, the baffle 180 leaves the separation hole 170. At the same time, the demolding assembly 120 down presses to let the food mixture 160 be separated from the forming mold assembly 110 through the separation hole 170 to the loading region 150.

FIG. 5A-5C are side views of the operation of a second embodiment of a food mixture forming apparatus 200 according to the present invention. Please refer to FIGS. 2-3 for the same component numbers, which will not be repeated here. In FIG. 5A, the second slider 114 is moved to a left side (the second side 144), so that the food mixture 160 can enter the feeding region 134, and a right side of the feeding region 134 in the figure is the first slider 112. Then, in FIG. 5B, the second slider 114 moves to the right so that the first scraper 136 scrapes off the excess food mixture 160 and has reached a state that the second slider is closest to the first slider 112, and the excess food mixture 160 is squeezed back into the barrel 146 by the first scraper 136 (in other preferred embodiments, it may also be executed by the second scraper 138). As can be seen from the figure, the shape of the food mixture 160 is basically formed here. In FIG. 5C, the food mixture 160 that has been molded is moved to the first side 142 of the platform 116, and then the demolding assembly 120 is pushed down along the second direction D2, the food mixture 160 is separated from the forming mold assembly 110 to complete the shaping operation.

Compared with the conventional art, because the forming mold assembly 110 of the preferred embodiment of the present invention uses the forming mold assembly 110 to squeeze the excess food mixture 160 back into the feeding barrel 146 when forming in the feeding region 134 without accumulation. Continuous production with the specific food mixture 160 is achieved. Multiple components reciprocating on the same plane make the food mixture and the individual component are kept consistent moving direction (for example, when the one component is moving on the first direction, the food mixture is moved on the first direction by the component, when another component is moving on the second direction, the food mixture is moved on the second direction by the other component. The food mixture merely moves on the same direction as the component at all time) to form the predetermined shape and easy demolding.

As described above, although the present application comprises been described with the preferred embodiments thereof, those skilled in the art will appreciate that various modifications, additions, and substitutions are possible without departing from the scope and the spirit of the application. Accordingly, the scope of the present application is intended to be defined only by reference to the claims.

What is claimed is:
1. A food mixture forming apparatus, comprising:
 a feeding barrel, providing a food mixture;
 a plurality of stirring rods disposed in the feeding barrel, pushing the food mixture on a platform;
 a forming mold assembly, comprising a first scraper, a first slider and a second slider, the first slider and the second slider being disposed on the platform below the feeding barrel, the first slider comprising a sliding region and a feeding region, the sliding region housing the second slider, the food mixture entering the feeding region to be moved on the platform by the first slider and the second slider, the first slider and the second slider performing reciprocation motion relative to each other along a first direction to form the food mixture by clamping and shaping the food mixture, the first scraper being disposed above the feeding region independently from the first slider and the second slider and removing an excess of the food mixture which is higher than the first scraper along the second direction to be pushed back into the feeding barrel, to adjust a weight of the food mixture entering the feeding region and make the food mixture to present a predetermined height along the second direction and a predetermined weight;

a demolding assembly, performing reciprocation motion along a second direction, making the food mixture to be separated from the forming mold assembly and the platform at a first side of the platform.

2. The food mixture forming apparatus according to claim 1, wherein the second slider further is disposed with a second scraper, which is used for removing the food mixture which is higher than the second scraper along the second direction and adjusting the weight of the food mixture entering the feeding region, making the food mixture to present the predetermined height along the second direction and the predetermined weight.

3. The food mixture forming apparatus according to claim 1, wherein a predetermined width of the food mixture is a nearest distance between the first slider and the second slider along the first direction, meanwhile, the food mixture is formed to a predetermined shape.

4. The food mixture forming apparatus according to claim 1, wherein the feeding barrel is used for placing the food mixture on the platform with a pressure, which is lower than another pressure performed on the food mixture by the first slider and the second slider when the first slider and the second slider are closest to each other.

5. The food mixture forming apparatus according to claim 1, further comprising a loading region, the food mixture is separated from the forming mold assembly through a separation hole to the loading region.

6. The food mixture forming apparatus according to claim 5, wherein the loading region, the platform and the forming mold assembly are orderly disposed along the second direction.

7. The food mixture forming apparatus according to claim 1, while the first slider and the second slider are at a second side along the first direction with respect to the first side, the food mixture is entered into the feeding region; while the second slider moves toward the first side along the first direction until the food mixture are shaped to a predetermined shape and push an excess of the food mixture outside the feeding region; while the predetermined shape is finished, the first slider and the second slider move from the second side to the first side along the first direction to bring the food mixture moving together.

8. The food mixture forming apparatus according to claim 1, wherein the food mixture is a food material without edible lubricating materials.

9. The food mixture forming apparatus according to claim 1, wherein the platform further comprises a separation hole and a baffle on the first side, while the food mixture does not move to the separation hole, the baffle blocks the separation hole; while the food mixture moves to the separation hole, the baffle leaves the separation hole.

* * * * *